Figures 1, 2:
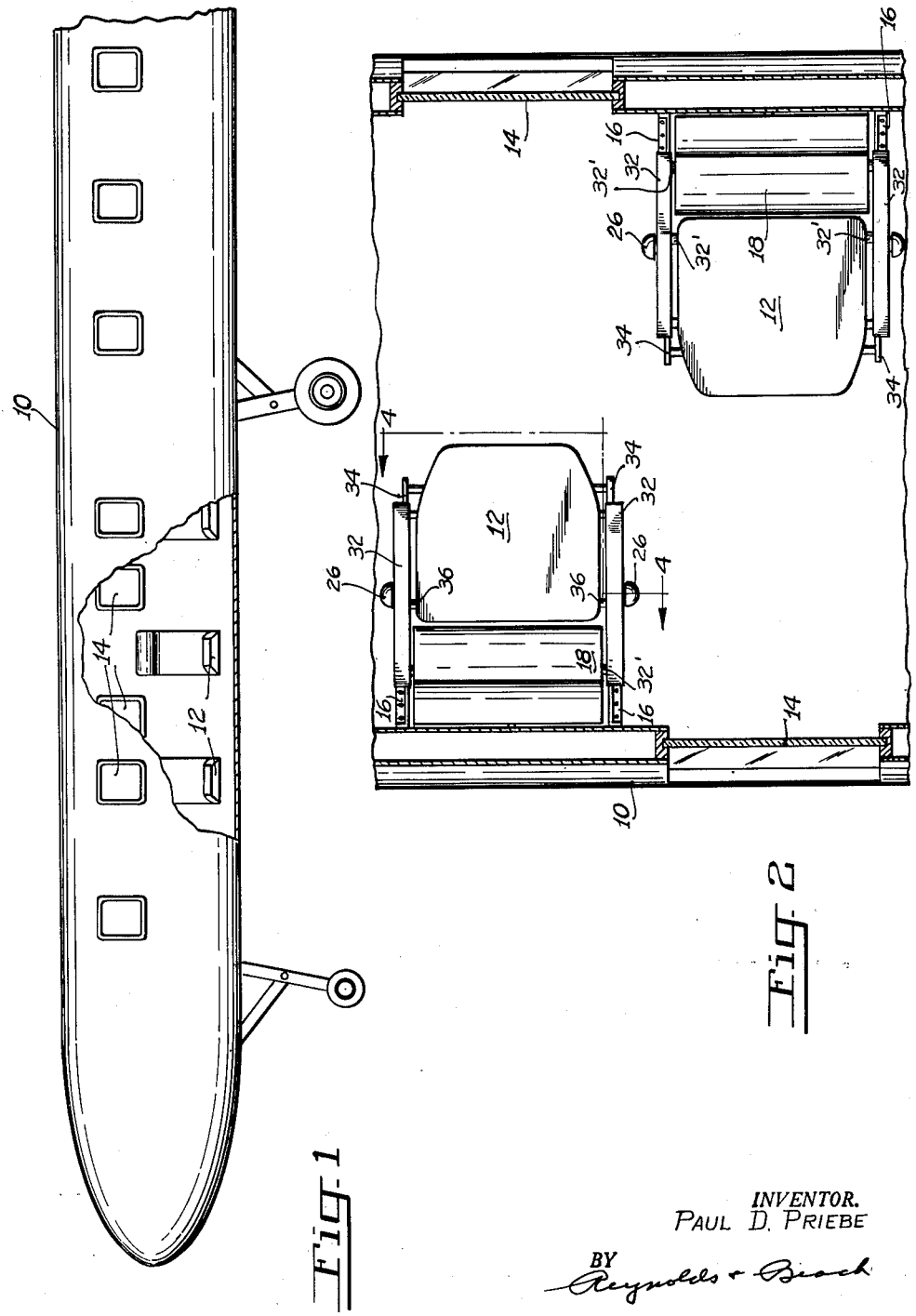

May 6, 1952 — P. D. PRIEBE — 2,595,607
AIRPLANE CABIN SEATING ARRANGEMENT
Filed Jan. 28, 1948 — 3 Sheets-Sheet 1

INVENTOR.
PAUL D. PRIEBE
BY
Reynolds + Beach
ATTORNEYS

May 6, 1952     P. D. PRIEBE     2,595,607
AIRPLANE CABIN SEATING ARRANGEMENT

Filed Jan. 28, 1948     3 Sheets-Sheet 2

INVENTOR.
PAUL D. PRIEBE
BY
Reynolds & Beach
ATTORNEYS

May 6, 1952 P. D. PRIEBE 2,595,607
AIRPLANE CABIN SEATING ARRANGEMENT
Filed Jan. 28, 1948 3 Sheets-Sheet 3

INVENTOR.
PAUL D. PRIEBE
BY
Reynolds & Beach
ATTORNEYS

Patented May 6, 1952

2,595,607

UNITED STATES PATENT OFFICE 2,595,607

AIRPLANE CABIN SEATING ARRANGEMENT

Paul David Priebe, New York, N. Y.

Application January 28, 1948, Serial No. 4,873

5 Claims. (Cl. 244—118)

This invention relates to improved compartmentation and seating arrangements for passenger aircraft, and has for its principal object the comfortable transportation of a greater number of passengers than was heretofore possible, in otherwise conventional aircraft of a given size or, alternatively, the accommodation of a given number of passengers in a smaller fuselage. The invention applies particularly to aircraft of circular or generally ovate fuselage cross-sectional shape, in connection with which it is a further important object to permit substantial reduction in fuselage cross section without sacrificing passenger capacity or reducing the comfort of of such passengers.

Among its various aspects, the invention contemplates certain improvements in the organization and seating arrangements for multiple deck passenger aircraft, particularly with reference to seating comfort and to adequacy of the head room available. The invention is concerned also, however, with improved seating arrangements in single-deck aircraft as will be described herein.

A further object is to enable all the passengers to look out of the airplane more readily.

These objects are considered to be of great contemporary importance, as evidenced by the current trend toward faster and more slimly designed aircraft, and also paradoxically, by the accompanying increased demand for greater passenger carrying capacity.

Since aircraft are becoming faster from year to year, it might be assumed that reduced space accommodations could be condoned without serious disadvantage, because of the decreased flight-trip time. However, this assumption is not well founded because aircraft are also being scheduled for longer non-stop flights, and the competitors of the airplane are constantly stressing comfort and convenience as basic attractions. It is evident, therefore, that the comfort of the passengers remains a factor of prime consideration in all passenger aircraft design. Consequently, interior compartmentation and seating arrangements should utilize to the greatest possible advantage all of the space available within the fuselage cover.

Such other considerations as improved visibility through the windows of the aircraft, distribution of passenger load from the aerodynamic standpoint, lightweight and sturdy structural design, and the general comfort and safety of the passengers must also be considered.

The various features, and other objects and advantages of the invention will become more fully apparent as the description proceeds, taken in connection with the accompanying drawings.

Figure 3:
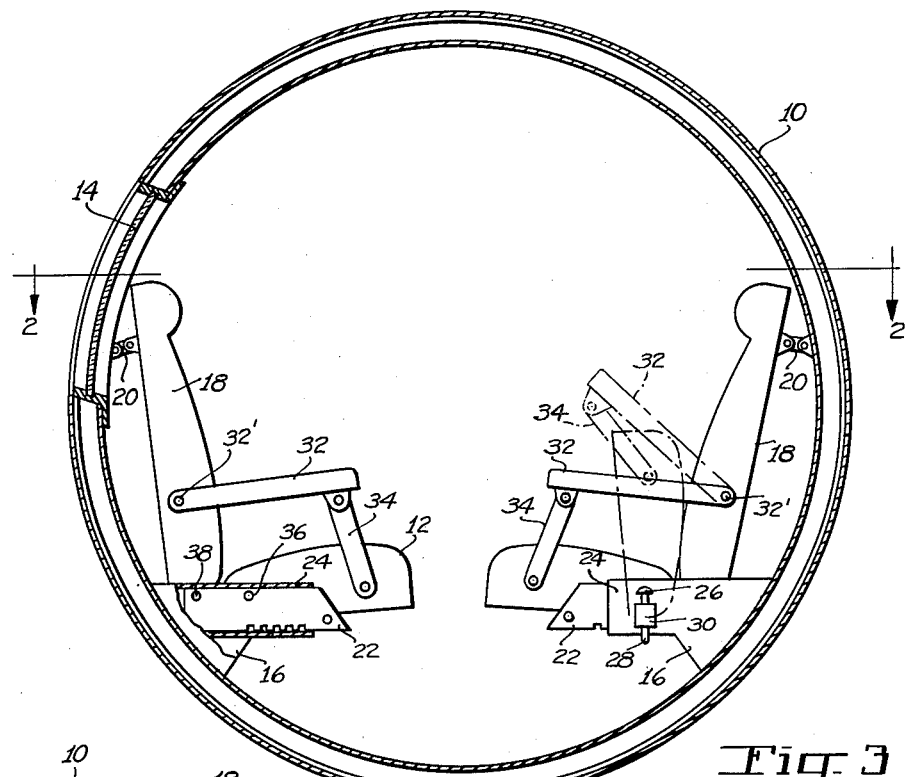
Figure 4:
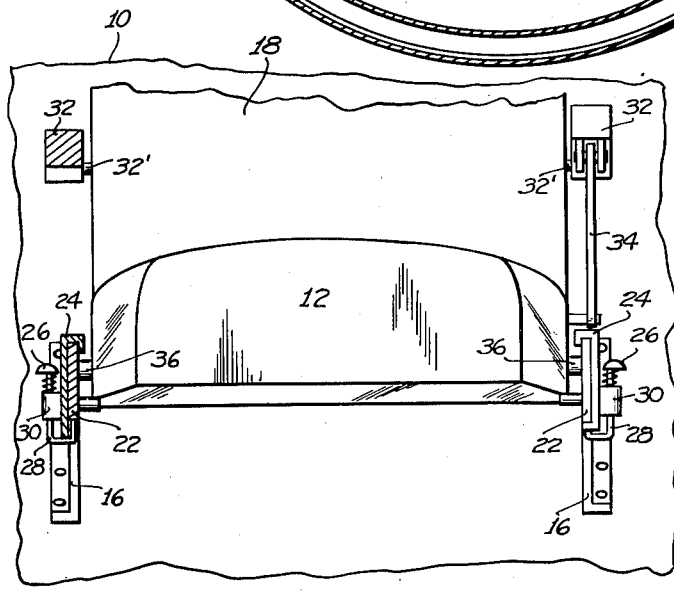

Figure 1 is a simplified side elevation view of the forward portion of the fuselage of an aircraft of modern design, showing a portion of the fuselage broken away to reveal the location of seats within in accordance with the invention. Figure 2 is a fragmentary transverse sectional view taken along the section line 2—2 of Figure 3 from just above the mid-plane of the fuselage, showing in plan the arrangement of the seat and windows. Figure 3 is a transverse sectional view of the fuselage showing the mounting positions of the seats as viewed in side elevation. Figure 4 is a front elevation view of an individual seat, with parts broken away along line 4—4 of Figure 2.

Figure 5:
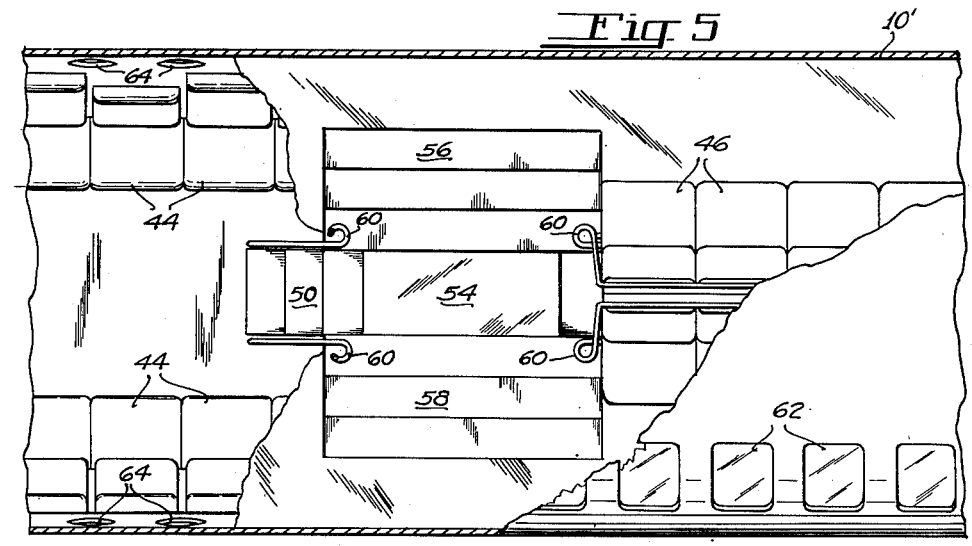
Figure 6:
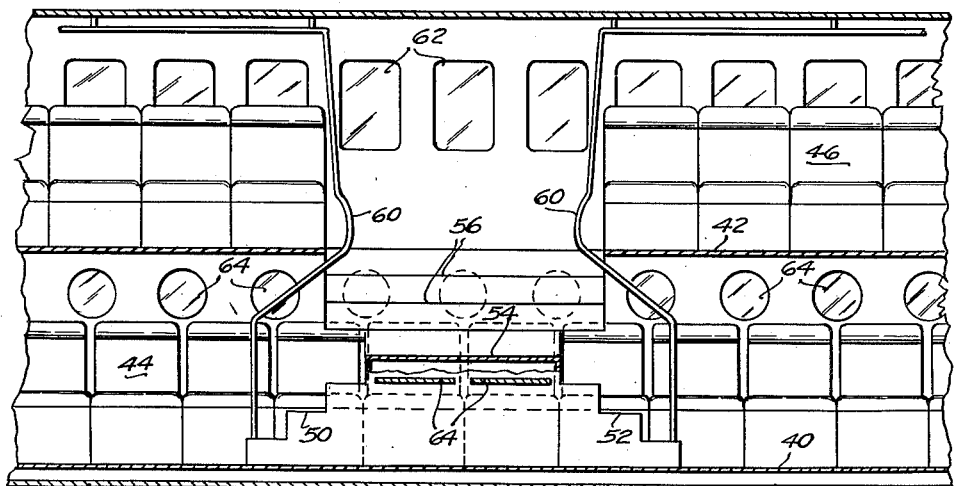
Figure 7:
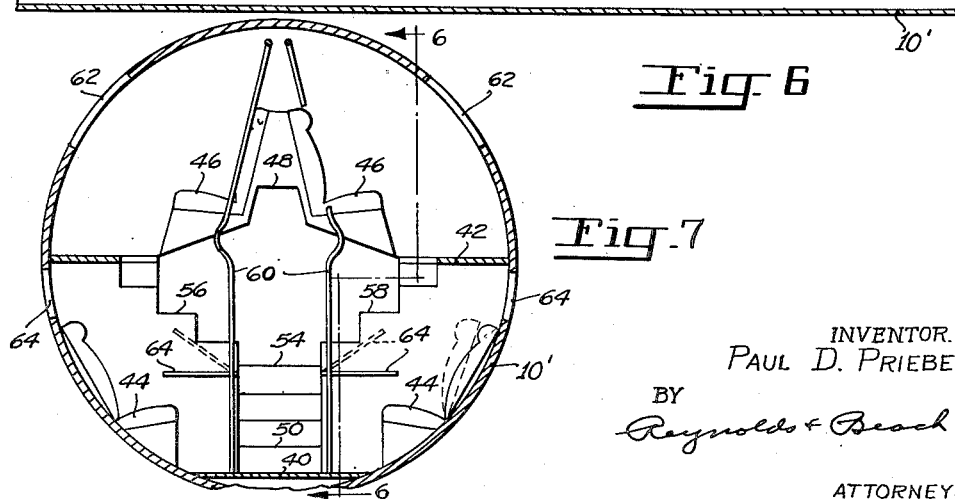

Figure 5 is a fragmentary plan view of a section of fuselage of a double deck passenger aircraft, with parts of the fuselage and upper deck broken away to show the arrangement of the seats and aisles on both decks, and the stairs between decks. Figure 6 is a longitudinal vertical sectional view of the same portion of the fuselage, showing the arrangement of seats on both decks. Figure 7 is a transverse sectional view through the fuselage.

In accordance with a feature of the present invention, I consider it desirable to seat the passengers facing generally athwartships, whether the aircraft be of the multiple or single-deck type.

Since individual seats are employed, they may readily be mounted to face at a small angle forwardly or rearwardly of the aircraft, instead of directly athwartship, either fixedly or adjustably, and either such an arrangement is embraced within the term "athwartship." In the single-deck type shown in Figures 1 to 4, the seats are placed in two rows, one row on each side of the lower portion of the fuselage with the seat backs adjacent to the wall and inclined generally chordwise of such wall. This arrangement utilizes most advantageously the space within the fuselage, and at the same time affords maximum comfort for the passengers.

Because of the small diameter of the fuselage shown, the seats of the opposite rows are staggered or offset, so that no two seats directly face each other, which adds to the leg room available to a passenger to assume a reclining position with his legs stretched across the width of the fuselage. It also permits locating large observation windows at a low level between seats of a row, each directly across from a seat in the opposite row, thus improving the visibility of the passengers.

In double-deck type aircraft, shown in Figures 5 to 7, the seating in the lower deck may be similar to that just described for single-deck aircraft, except that the seats located generally chordwise of the fuselage at each side facing generally athwartship are located side-by-side, instead of adjacent seats being spaced apart. On the upper deck the seats are located in adjacent rows centrally of the fuselage back to back and facing outwardly, generally athwartships. In this way, increased head room for the central passenger aisle of the lower deck may be provided beneath the upper deck seat bottoms at either side of and above the lower deck aisle and centrally to an even greater height in the inverted V-shaped space between the oppositely inclined seat backs in the upper deck, which may extend upward considerably higher than the floor level of the upper deck, without in the least impairing the usable space in the upper deck.

The upper deck aisles are then located along opposite sides of the fuselage in front of the seats. A tall person walking along such aisle may lean somewhat over the seated passengers, but need not crouch. An overhead hand rail extending longitudinally of the rows of seats may be grasped for support.

The upper deck may be appropriately referred to as the observation deck because the arrangement of the seats in the central portion permits the incorporation of large low windows in the sides directly in front of the seats. Passengers seated will be comparatively close to the windows so that they may look outwardly and downwardly at a convenient angle. On both decks, and particularly the upper deck, a seat may be omitted at intervals, if desired, in order to allow passengers to pass easily in the aisles.

The aircraft fuselage of Figures 1 to 3, inclusive, is assumed to be so narrow that no two seats could be mounted directly oppositely if the passengers are to have sufficient space for comfort, and so the seats are offset or staggered in the opposite rows to provide the desired amount of leg room and to permit extending a seat to enable a passenger to recline, if desired. But this offset arrangement has the special and further advantage that the seats may be individually adjustable over a wide range crosswise of the aircraft to enable the seat to assume the varying attitudes desirable for the greatest comfort of the passengers, and a large window may be installed in the opposite wall of the fuselage at a low elevation, through which a relaxing passenger can view the panorama of the surrounding countryside and skies; that is, the sill or lower edge of the window may be well below the level of the top of the adjoining seat backs since there is no seat back directly in front of the window.

Thus the aircraft 10 is provided with rows of inwardly facing seats 12 on opposite sides of the fuselage and spaced apart lengthwise thereof to provide intermediate open areas for the installation of comparatively large observation windows 14 through which the passengers seated in the opposite row of seats may look. Consequently, the rows of windows in the opposite sides of the aircraft will also be offset with respect to each other.

In accordance with the details of the particular illustration, the fuselage is shown as being of double wall insulated construction, to the inner wall of which seat mounting brackets 16 are attached at perhaps one-fifth of the height of the fuselage above the floor level, the appropriate height being determined in each case by the actual diameter of the fuselage. The seat backs 18 are inclined upwardly and outwardly chordwise of the cylindrical fuselage wall, and their angle may be adjusted by shifting the seats proper in and out. Each seat back is attached to the fuselage wall for vertical displacement, by pivotally connected links 20 pinned at their opposite ends to corresponding lugs on the fuselage wall and seat backs.

The seats proper are supported for sliding on notched bars 22 which are guided for lengthwise movement in a direction crosswise of the aircraft, by channel-shaped rails 24 carried by the mounting brackets 16. At the sides of the rails are attached suitable locking means for engaging releasably the notches in the slidable bars to hold a seat in a selected adjusted position. Such means is shown as comprising the spring held release handle 26 at the end of a J-shaped latch 28, the upturned lower end of which is received in an aperture at the base of the rail 24, and is thrust upwardly into engagement with one or another of the notches in the bars, and held there by the spring reacting from the base member 30 of the device, as shown in Figure 4. Any other suitable seat adjusting arrangement could be employed.

Each seat has a pair of side arms 32 attached pivotally at their inner ends 32' to the adjacent sides of the backs, and supported by means of the pair of links 34 pivotally interconnecting the forward ends of the arms and points at the sides of the seats near their front edges, respectively. To complete the construction by which the seats may be swung into folded position, the rear portion of each seat pivots about a horizontal shaft 36 and the base of each seat back about a horizontal shaft 38. Clearly, other types of seats could be employed in the proposed general seating arrangement, and particularly would be required were the seats adjustable to face at a small angle forwardly or rearwardly of the aircraft, as well as directly athwartship.

It will be understood that the individual seat units could be made to seat two individuals instead of just one, if desired, even where the alternate arrangement is employed, in which latter event the spaces between adjacent sets of seats in a row would be all the greater and the observation windows could be of correspondingly greater size, provided that they were not so large as to impair the fuselage strength unduly. The important feature in any event is the increase in passenger capacity and comfort by matching the natural curvature of the fuselage with the inclined backs of the seats so that one complements the other and the seats are set back from the center space as far as possible.

With a double-deck type aircraft, as shown in Figures 5, 6 and 7, the seats of the lower compartment may be arranged as in the single-deck form described above, so that the seats are fitted snugly and complementally to the shape of the fuselage. In this case there is a comparatively wide central aisle 40 between the rows of seats 44, also arranged with their backs generally chordwise of the fuselage.

The upper deck is divided centrally into two compartments or spaces in the form of longitudinally extending sectors of the cylindrical fuselage space. Each such upper deck space has a side aisle 42 directly in front of the adjoining central row of athwartships facing seats 46, the aisles providing leg space for the seated passengers.

The upper deck forming the aisles, and the under structure of the seats serves generally as a ceiling for the lower deck. Such floor may be located substantially at or somewhat below the horizontal diametral plane of the fuselage, where there are only two decks in all.

An inverted, V-shaped space 48 is formed beneath the floor and beneath the inclined backs of the central row of seats on the upper deck, which provides added head room for even the tallest passengers moving erect in the central aisle of the lower deck, supplementing the normally adequate headroom extending over the entire lower aisle beneath the upper deck seats. The supporting structure for the upper deck seats may be readily adapted to preserve this space in any convenient manner, such as by the construction illustrated in simplified form in Figure 7 where it forms a central arch which flares outward at the seat level abruptly, to the forward edges of the seats, and then abruptly downwardly to merge with the side portions of the upper deck floor. The structural details are omitted from the drawings because they are not of particular importance and may vary widely with design preference. Overhead hand rails (not shown) may be provided to aid a person walking through the lower aisle.

To afford passage between the upper and lower decks a double-stairs arrangement is shown, which might be located amidships between sections of upper and lower deck passenger compartments. The stairs include two opposite lower flights 50 and 52 which are spaced fore and aft and ascend to a central landing 54, at a level approximately midway between the elevations of the aisles on the upper and lower decks. From the landing further ascending flights of steps 56 and 58 rise in the athwartships direction for the remaining distance to the level of the opposite aisles of the upper deck compartments, respectively.

Four hand rails 60, at the sides of the stairs, wind upwardly from their base part way up the second stair flights, where they bend upwardly and are joined abruptly to the hand rails extending lengthwise of the aircraft along the ceiling of the upper deck compartment and over the backs of the rows of seats, such a rail being disposed over each row of seats. Hence, a passenger ascending or descending the stairs is afforded the aid of the hand rail all the way between the lower deck and the upper deck. Upon arrival at the upper deck, the passenger's hand may follow directly along the overhead rail.

Opposite each observation deck seat 46 may be a large low observation window 62 which will offer special attractions to the occupancy of the upper deck, even though the aisles are not quite as convenient as on the lower deck. The lower deck fuselage portion may also have windows 64 above the backs of the seats, arranged in staggered relationship with the seats as shown in Figure 6. Of course, if seating capacity were not considered to be of vital importance the seats of the lower deck could be arranged alternately on opposite sides, and large and low windows could be located intermediately between adjacent seats, as in the single-deck aircraft illustrated in Figures 1 to 3, inclusive. As in the case of the single-deck aircraft, both the seats of the lower deck and the seats of the upper deck in the present instance may be of the double or single type, and particularly if single, may be inclined somewhat forwardly or rearwardly from the direct athwartships-facing position.

It will be evident that a passenger may go from the lower deck compartment at one side of the stairs to the lower deck compartment at the opposite side of the stairs over the stair landing 54, although it would be possible to pass around the lower stairs 50 and 52 through either of the spaces beneath the upper stair flights. Preferably the spaces beneath the upper, athwartships-ascending stairs 56 and 58 are used, as shown, as writing compartments with seats and corresponding drop-leaf tables 64 arranged conveniently.

In the illustrated structure of Figures 5, 6 and 7, if it be assumed that the contour of the fuselage is circular and of approximately 10 feet in inside diameter, at least six feet overhead clearance between the roof of the tunnel under the upper deck seats and the floor of the lower deck central aisle is available. The central aisle itself, even though normal size passenger seats are used, affords clearance between the seats exceeding four feet, so that the effective space for walking between the rows of seated passengers would be two to three feet. The upper deck aisles along the outer side of each compartment could be nearly two and one-half feet in width, although the effective head clearance would be less than in the lower deck aisle. In walking along the upper aisles the passenger would normally lean inward somewhat. If desired the added head clearance afforded between upper deck seat backs could be utilized instead for ventilation, lighting facilities or the like, since the height to the seat level is already in the vicinity of six feet.

The present description is intended as illustrative, only the portions of the aircraft directly involved being illustrated, and these in simplified manner. Substitute or additional stairs between the decks could be provided at the remote ends of compartments, supplementing or replacing the stairs shown in Figures 5, 6 and 7. Such an end stair might, for example, comprise a stair following a generally spiral contour upwardly from the lower deck to the upper deck. These and other variations in the details and arrangements of the installation are within the board principles of the invention.

I claim as my invention:

1. In a seating arrangement for passenger aircraft cabins, seats arranged in separate rows along the opposite sides of the aircraft fuselage in its lower portion, facing athwartships inwardly, the seats of each row being spaced apart and the seats in the two rows being staggered relatively to provide room between the seats of each row to accommodate the feet of the occupants of the seats in the other row, said fuselage being of such narrow width at seat level as to preclude location of seats directly opposite each other on opposite sides thereof while leaving room for the occupants.

2. In the seating arrangement for passenger aircraft cabins defined in claim 1, observation windows located directly in front of the seats of one row, respectively, between seats of the opposite row.

3. In the seating arrangement for passenger aircraft cabins defined in claim 1, observation windows located directly in front of the seats of one row, respectively, and between seats of the opposite row, and below the level of the backs of such latter seats.

4. In an aircraft fuselage cabin, a plurality of individual seats mounted at the opposite sides of the aircraft fuselage facing generally athwartships inwardly, and with the backs of the seats extending generally chordwise of the fuselage contour, such individual seats including a seat member, means mounting said seat member for adjustment toward and away from the adjacent fuselage wall, an inclined back member closely adjacent to the fuselage wall, back securing means connecting the upper portion of said back member to the wall of the fuselage adjacent thereto, and means supporting the base of said back member for movement toward and away from the fuselage wall conjointly with said seat member, to vary the inclination of such back member, said back securing means being sufficiently flexible to accommodate the change in inclination of the back member while securing it to the fuselage wall.

5. In the aircraft fuselage cabin defined in claim 4, the back securing means connecting the fuselage wall and the upper portion of the back member comprising a link pivotal in a vertical plane with respect to both the fuselage wall and the back member of the seat.

PAUL DAVID PRIEBE.

REFERENCES CITED

The following references are of record in the file of this patent:

UNITED STATES PATENTS

| Number | Name | Date |
| --- | --- | --- |
| 1,150,679 | Jones et al. | Aug. 17, 1915 |
| 1,217,174 | Hedley et al. | Feb. 27, 1917 |
| 1,754,465 | Hansen | Apr. 15, 1930 |
| 1,767,488 | Staut | June 24, 1930 |
| 2,046,859 | Weiss et al. | July 7, 1936 |

OTHER REFERENCES

"Flight" of Oct. 19, 1944, pages 420A, 420B, 421 and "supplement."